Patented Nov. 7, 1950

2,528,496

UNITED STATES PATENT OFFICE 2,528,496

PHOTOSENSITIVE LEUCOCYANIDE COMPOSITION

Lyman Chalkley, Brick Township, Ocean County, N. J.

No Drawing. Application April 30, 1946, Serial No. 665,959

4 Claims. (Cl. 95—7)

(Granted under the act of March 3, 1883, as amended April 30, 1928; 370 O. G. 757)

This invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to the dye art, and more particularly to improved photosensitive materials, especially those which utilize the photosensitive properties of the leucocyanides of triarylmethane dyes, and also to processes for preparing photosensitive and colored porous material.

Unlike most previously known photosensitive substances, the leucocyanides of the triarylmethane dyes, in their pure solid form, are not sensitive to light. It is only in solution that they respond to light by the formation of dye stuffs. Furthermore, the nature of the solvent exercises a determining influence upon the sensitivity of a leucocyanide solution to light.

Experience also shows that when the leucocyanides, such as those of crystal violet and fuchsine are dissolved in dimethyl phthalate, benzyl benzoate, ethyl cinnamate, nitroethane, 1-nitropropane, 2-nitropropane, dibutyl phthalate, ethyl $\alpha$-naphylacetate, N-methyldiphenyl-amine, N-dibutyltoluene sulfonamide, or numerous other solvents, the solutions fail to develop the dyestuff colors on exposure to ultraviolet light.

Heretofore it has been proposed to use ethyl alcohol as a solvent for the leucocyanides of crystal violet and fuchsine in the preparation of photosensitive leucocyanide solutions.

The limitation of the photosensitive reactions of the leucocyanides to ethyl alcoholic solutions, which had been implicit in previous writings on the subject, restricted the use of such solutions. Thus, because of the volatility of the solvent, such solutions can be preserved, and, in general, can be used, effectively only in closed vessels. An ethyl alcoholic solution is practically useless for sensitizing paper, cloth, and the like, because of the volatility of the solvent. Another drawback to the use of alcoholic solutions lies in the inflammability of the solvent, which makes it dangerous to use in the vicinity of carbon arcs, spark discharges, flames, and other hot sources of light. A further limitation on the use of alcoholic solutions lies in the low solubility of some of the leucocyanides, e. g., that of crystal violet, in alcohol, which restricts the intensity of color that can be produced by light.

Although the use of ethyl alcohol as the solvent for photosensitive leucocyanide material is attended by the above described disadvantages, relatively few solvents have heretofore been suggested for such purpose, and of these few the ethyl alcohol was the most satisfactory. In fact, the solvents which heretofore have produced photosensitive solutions of such leucocyanide materials have been very limited in number and in properties.

The present invention obviates the above stated difficulties by providing photosensitive leucocyanide solutions which are less volatile and can be made more concentrated than the previous alcoholic solutions, and which after color has been produced by exposure to ultraviolet light do not fade in the dark.

It is therefore an object of this invention to provide photosensitive leucocyanide materials which on irradiation with ultraviolet light produce colors which do not fade in the dark and which are exceptionally brilliant.

Another object is to extend the range of compatability of photosensitive leucocyanide materials with other substances, such as plastics and inorganic compounds.

Still another object is to provide improved processes for photosensitizing porous material and making colored porous material.

A further object is to extend the use of leucocyanides to photosensitive sheet materials.

Other objects and advantages will be apparent from the following description of this invention and the appended claims.

It is part of the present discovery that suitable solvents for the preparation of photosensitive leucocyanide solutions are carboxylic acids which transmit radiation or ultraviolet light of wave length falling between about 2100 angstrom units and about 3800 angstrom units, preferably between about 2100 angstrom units and about 3300 angstrom units.

Examples of carboxylic acids which have been found to be suitable in the practice of this invention as solvents for the leucocyanides of triarylmethane dyes are: acetic acid, propionic acid, butyric acid, valeric acid, caproic acid, caprylic acid, capric acid, undecylic acid, lauric acid, hydrocinnamic acid, ethyl acid phthalate, and n-butyl acid phthalate.

It has been found that the carboxylic acids may be used singly or in any admixture with one another as the solvent for the leucocyanides of the triarylmethane dyes.

Leucocyanides which have been found to be suitable for use in the practice of the present invention are those of pararosaniline, rosaniline, malachite green, new fuchsine, methyl violet, ethyl violet, crystal violet, victoria blue, benzaurine, and brilliant green.

Experience shows that the concentration of a leucocyanide of a triarylmethane dye in a carboxylic acid solvent is not critical. In fact, such concentration may range from 0.01 of one per cent to the maximum amount that will dissolve in the carboxylic acid solvent. Unlike solutions of fluorescent dyes, photosensitive solutions of the present invention do not lose their sensitivity as the concentration of the leucocyanide increases, rather their sensitivity to ultraviolet light increases with the concentration of the leucocyanide in the solution.

It has also been found that more than one leucocyanide of a triarylmethane dye may be combined in a single solution with carboxylic acid as the solvent to provide a color corresponding to an admixture of the respective dyes.

The present invention may be practiced in the testing of ultraviolet frequencies. Such test may be made by taking advantage of the different absorption spectra of the leucocyanides, combinations of the leucocyanides being used to prepare a solution which responds to one ultraviolet frequency with a production of a certain color tone and to other ultraviolet frequencies with a production of other color tones. Thus, the resulting color tone indicates a particular ultraviolet frequency.

Whether the leucocyanides of the triarylmethane dyes are used singly or in admixture in the carboxylic acid solvent, the foregoing statement on concentration has been found to be applicable.

The photosensitive solutions of this invention are normally colorless, and, within the limitations imposed by the light transmission characteristic of the solvent, are sensitive to radiations ranging in wave length from about 2100 angstrom units to the long wave length limit of absorption of the leucocyanide. The sensitivity may be limited to narrower ranges of wave lengths by incorporating in the solution a substance which transmits a portion of the spectrum between about 2100 angstrom units and about 3800 angstrom units, while absorbing the remainder of this range of wave lengths. For example, aesculin confines the sensitivity of a leucocyanide solution largely to the region of about 2600 angstrom units to about 2750 angstrom units, and wave lengths longer than about 3700 angstrom units.

The addition of agents, such as aesculin, does not impart a color to the colorless leucocyanide solution. However, there are many dyes, such as auramine, aurantia, chrysophenine, phloxine, orange G, and acid green, which exhibit both a visible color and a partial transmission of radiation in the 2100 angstrom units to 3300 angstrom units region. These dyes may be added to leucocyanide solutions to give a narrowed range of spectral sensitivity and also an initial visible color.

The photosensitive solutions of the present invention may be used in the form of liquids for such purposes as photometry of the ultraviolet and photochemical demonstrations.

An equally important use of the present solutions, made possible by their low volatility, lies in the impregnation of porous sheet material, such as paper, cloth and wood. Such impregnated material is thereby rendered photosensitive, and may be used for photographic purposes, actinometry and the like. Impregnation is readily carried out through the application of the photosensitive liquid solution to the porous material by any convenient method, such as dipping, stamping, printing, spraying, and floating.

For impregnating porous material, it has been found to be convenient in many instances to dilute or mix the photosensitive solution with a low boiling solvent, such as benzene, toluene, ether, ethyl acetate, chloroform, carbon tetrachloride, and the like, impregnate the porous material with this dilute photosensitizing liquid, and evaporate the volatile solvent by exposure of the impregnated porous material to the air, warming in an oven, or by any other suitable method. The porous material, after the evaporation of the volatile solvent, is irradiated with ultraviolet light to produce a fast and exceptionally brilliant color.

When using a volatile solvent to aid in the impregnation of porous materials, it is preferable to employ as the carboxylic acid to remain after the evaporation of the volatile solvent an acid with a boiling point above a temperature of 140° C. It is then convenient to use a volatile solvent, such as ethyl ether, isopropyl ether, ethyl acetate, benzene, toluene, nitromethane, nitroethane, acetone, methylethyl ketone, chloroform or carbon tetrachloride, which boils below a temperature of 120° C.

Since many apparently widely differing embodiments will be apparent to one skilled in the art, it is obvious that various changes may be made in the specific details of the invention without departing from the spirit and scope thereof.

I claim:

1. Photosensitive material comprising a leucocyanide of a triarylmethane dye dissolved in at least one carboxylic acid which transmits radiation of wave length within the range of about 2100 angstrom units to about 3800 angstrom units, said leucocyanide when irradiated with ultra-violet light within said range and in the presence of said acid producing color which does not fade in the dark.

2. Photosensitive sheet material comprising a porous sheet impregnated with a leucocyanide of a triarylmethane dye dissolved in at least one carboxylic acid which transmits radiation of wave length within the range of about 2100 angstrom units to about 3800 angstrom units, said leucocyanide when irradiated with ultra-violet light within said range and in the presence of said acid producing color which does not fade in the dark.

3. Photosensitive material comprising a leucocyanide of a triarylmethane dye dissolved in at least one carboxylic acid which transmits radiation of wave length within the range of about 2100 angstrom units to about 3800 angstrom units, and a substance adapted to absorb part of the radiation transmitted by said acid, said leucocyanide when irradiated with ultra-violet light within said range and in the presence of said acid producing color which does not fade in the dark.

4. Photosensitive sheet material comprising a porous sheet impregnated with a leucocyanide of a triarylmethane dye dissolved in at least one carboxylic acid which transmits radiation of wave length within the range of about 2100 angstrom units to about 3800 angstrom units, and a substance adapted to absorb part of the radiation transmitted by said acid, said leucocyanide when irradiated with ultra-violet light within said range and in the presence of said acid producing color which does not fade in the dark.

LYMAN CHALKLEY.

REFERENCES CITED

The following references are of record in the file of this patent:

UNITED STATES PATENTS

| Number | Name | Date |
|---|---|---|
| 1,845,835 | Frankenburger et al. | Feb. 16, 1932 |
| 2,304,940 | Mannes et al. | Dec. 15, 1942 |
| 2,322,027 | Jelley et al. | June 15, 1943 |

FOREIGN PATENTS

| Number | Country | Date |
|---|---|---|
| 4,994 | Great Britain | of 1904 |

OTHER REFERENCES

Journal Of The American Chemical Society, vol. 57, pages 1151–1159 inclusive.

Journal Of The Chemical Society (London), 114, I, pages 313 and 314.